(12) United States Patent
Vallée et al.

(10) Patent No.: US 7,490,935 B1
(45) Date of Patent: Feb. 17, 2009

(54) OVERMOLDED SPECTACLE ARM EXTREMITIES

(75) Inventors: Pierre Vallée, Thetford-Mines (CA); Stéphane Morency, Montreal (CA); Stéphane Lebel, St.-Rédempteur (CA)

(73) Assignee: Revision Eyewear, Inc., Montreal, Quebec (CA)

( * ) Notice: Subject to any disclaimer, the term of this patent is extended or adjusted under 35 U.S.C. 154(b) by 19 days.

(21) Appl. No.: 11/811,360

(22) Filed: Jun. 9, 2007

Related U.S. Application Data

(60) Provisional application No. 60/812,432, filed on Jun. 9, 2006.

(51) Int. Cl.
*G02C 5/14* (2006.01)
(52) U.S. Cl. ...................... 351/122; 351/121
(58) Field of Classification Search ............ 351/41, 351/44, 111–123; 2/448–450
See application file for complete search history.

(56) References Cited

U.S. PATENT DOCUMENTS

| | | | |
|---|---|---|---|
| 3,402,005 A | 9/1968 | Mundt et al. | |
| 3,953,114 A | 4/1976 | Bidgood | |
| 4,222,640 A | 9/1980 | Bononi | |
| 5,272,494 A | 12/1993 | Kamon | |
| 5,610,669 A | 3/1997 | Kuipers et al. | |
| 5,708,491 A | 1/1998 | Onodera et al. | |
| 6,644,806 B2 | 11/2003 | Wu | |
| 6,758,562 B1 * | 7/2004 | Barnette et al. | 351/111 |
| 7,011,404 B2 | 3/2006 | Howard et al. | |
| 7,055,952 B2 * | 6/2006 | Fecteau et al. | 351/122 |
| 2003/0020866 A1 | 1/2003 | Asano | |
| 2004/0179166 A1 | 9/2004 | Jannard | |
| 2005/0275794 A1 | 12/2005 | Howard | |

* cited by examiner

*Primary Examiner*—Huy K Mai
(74) *Attorney, Agent, or Firm*—Erickson Law Group, PC

(57) ABSTRACT

A stem for eyewear includes an elongated base configured for support on a user's ear and comprising a relatively hard material and a soft pad portion overmolded onto the elongated base. The base comprises at least one through hole and the soft pad portion comprises an anchor portion that is continuous through the through hole. The base also includes an anchor loop on an end that is covered and penetrated by the soft pad portion.

9 Claims, 5 Drawing Sheets

OVERMOLDED SPECTACLE ARM EXTREMITIES

This application claims the benefit of U.S. Provisional Application Ser. No. 60/812,432 filed Jun. 9, 2006.

TECHNICAL FIELD OF THE INVENTION

The present invention relates to eyewear having temples or stems to support the eyewear on a wearer's head. The invention is particularly directed to protective eyewear, such as used by military and law-enforcement personnel.

BACKGROUND OF THE INVENTION

Specially adapted, protective eyewear is used today by soldiers and law enforcement officers. The use of such eyewear is particularly advantageous in harsh environments where sunlight, wind, dust and debris can be hazardous to eyesight. Additionally, such eyewear can be designed to protect the eyes against some level of impact of fragments and projectiles during battle. Such eyewear includes the Sawfly™ shield, available from Revision Military of Montreal, Canada, or Revision Eyewear, Ltd. of Williston, Vt., USA.

The present inventors have recognized that such eyewear could be improved by having more durable, and more cost effectively manufactured ear stem or temple pads. The present inventors have also recognized that the ear stem pads could assist in preventing scratching of the inside surface of the lens when the eyewear is folded up for storage.

SUMMARY OF THE INVENTION

The invention provides an improved ear stem or temple for a spectacle or eyeshield that includes a stem base structure of a relatively hard material and a soft pad portion composed of a relatively softer and/or more resilient material that is overmolded onto the base structure.

The base can include at least one through hole and the soft pad portion comprises an anchor portion that is continuous through the through hole. The base also includes an anchor loop on an end that is covered and penetrated by the soft pad portion.

Preferably the base structure is composed of NYLON or similar material and the soft pad portion is composed of a thermoplastic elastomer.

The soft pad portion includes a plurality of anchor portions that are molded through apertures provided through the base structure.

The soft pad portion provides soft protector portions covering the tip ends of the ear stems. The soft protector portions are effective, not only to prevent irritation when putting the eyewear on the wearer's head, but prevents scratching of the inside of the lens by the stem tip ends when the stems are folded to the lens in a conventional manner to store the eyewear in a pocket or case.

The present invention provides a secure and rugged manner of attaching a soft portion of eyewear stems that resists removal under harsh conditions. The soft portion is not only overmolded onto the harder stem base structure, but is also anchored by the interacting geometry of the two molded components to form both a chemical and a mechanical fixation.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
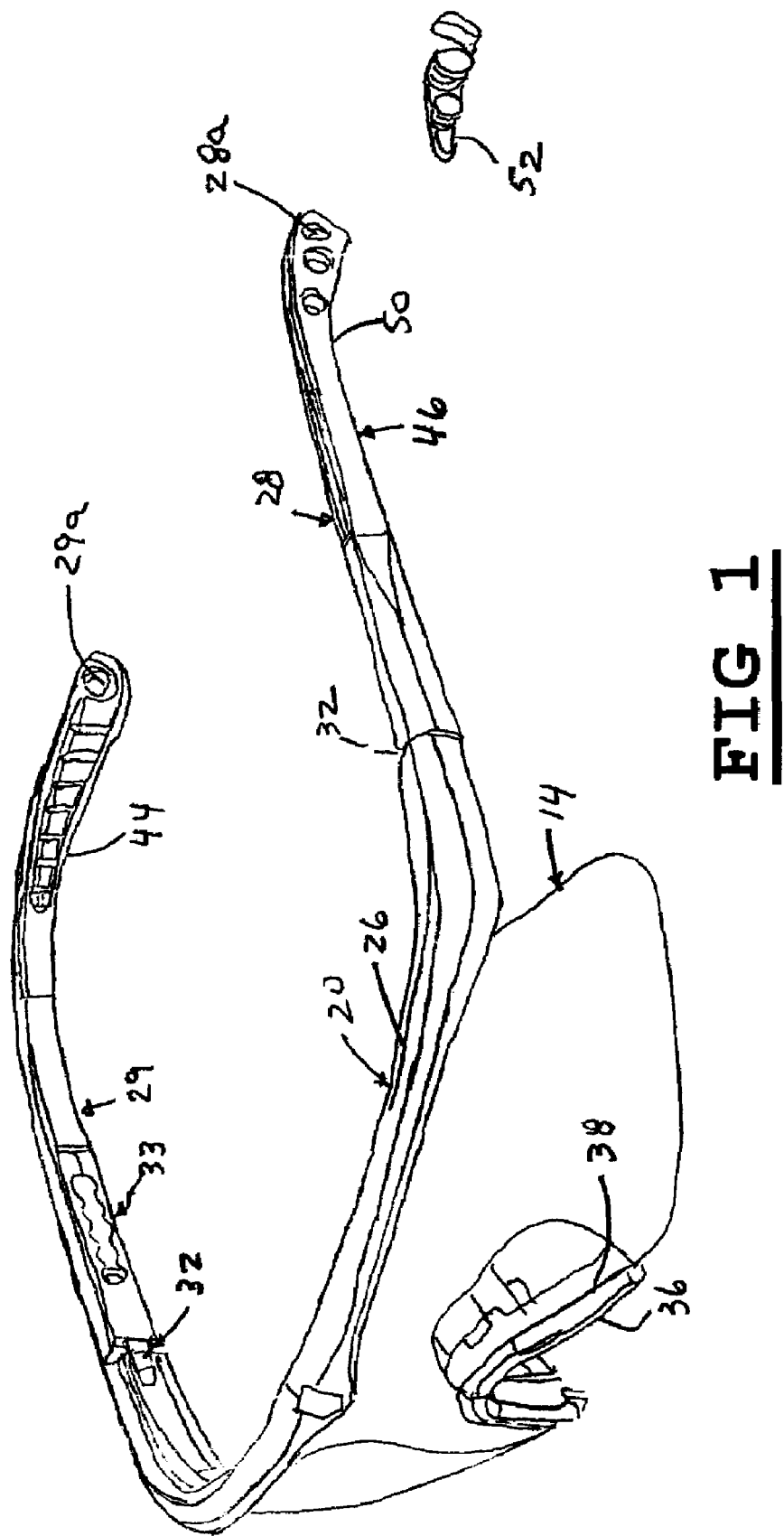
FIG. 1 is an exploded, front perspective view of a visor system attached to a helmet in accordance with the present invention.
Figure 2:
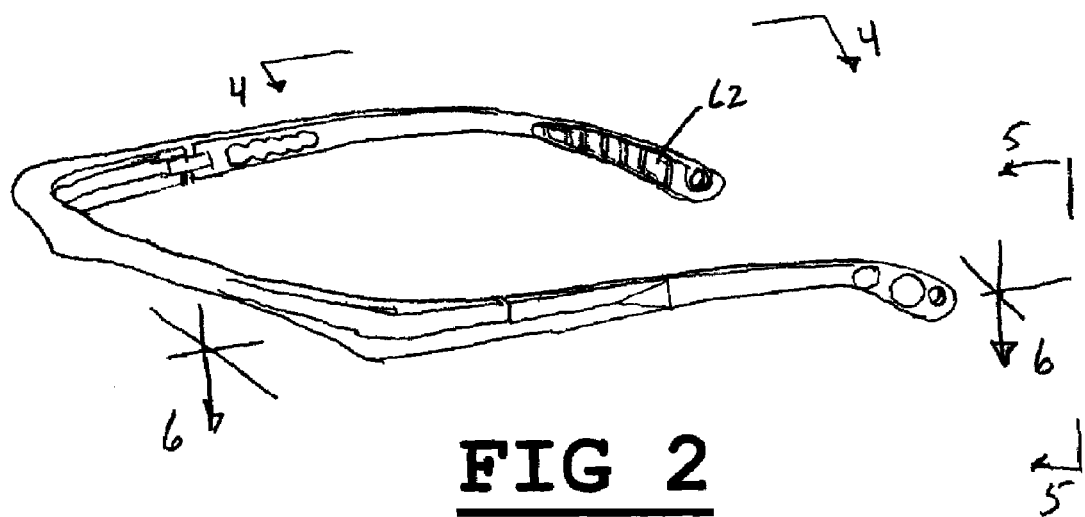
FIG. 2 is a perspective view of a frame and two ear stems taken from FIG. 1.
Figure 3:
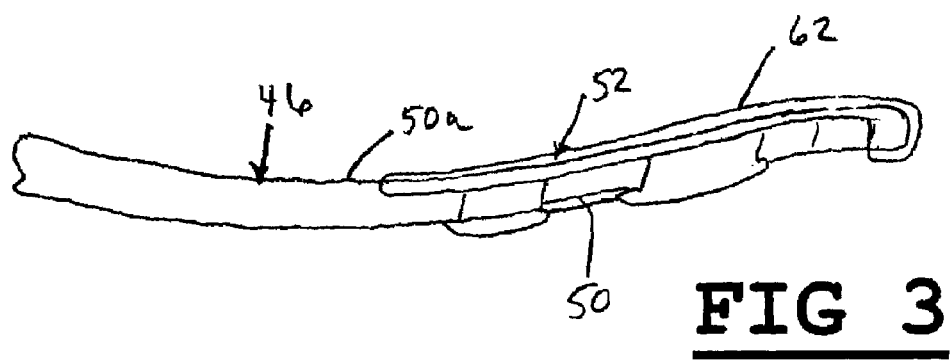
FIG. 3 is a fragmentary, transparent, top view of one ear stem taken from FIG. 2.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a military-type protective shield 14 such as the Sawfly™ shield available from Revision Military of Montreal, Canada, or Revision Eyewear, Ltd. of Williston, Vt., USA. The shield 14 includes a frame 20 which releasably holds a lens 22. The lens 22 can be a projectile impact resistant lens. In this regard the lens 22 can be composed of optical grade polycarbonate having a thickness of about 2.4 mm in a central location and a decreasing thickness to about 1.8 mm at its edges. The frame 20 includes a frame bar or bridge 26 and a pair of side temples or ear stems 28, 29. The temples 28, 29 are pivotally attached to the bridge 26 by hinges 32. Provisions 33 can be made along each of the temples for adjusting the length of the temples. Holes 28a, 29a can be provided for retaining a strap.

A nosepiece 36 is fit onto the lens 22 along a notched area 38. Provisions in the form of tabs, hooks or claws are provided in the notched area 38 to underlie bottom portions of the nosepiece to hold the nosepiece to the lens 22. The nosepiece 36 is snapped up into the lens 22 until the hooks underlie the bottom portions.

The stems 28, 29 include head-engaging distal end portions 44, 46. The distal end portions 44, 46 are mirror image identical so that only one of the portions 44, 46 need be described.

The portion 46 includes a relatively hard base structure 50 and a soft pad portion 52. Although these parts are shown separate in FIG. 1 for explanation purposes, in the manufacturing process the part 52 is molded onto the part 50 and would not exist as a separate part. The base structure 50 is composed of a relatively hard plastic material such as polyamide or NYLON. The soft pad portion 52 is composed of a relatively soft, resilient material such as a thermoplastic elastomer. One exemplary thermoplastic elastomer is SANTOPRENE, a thermoplastic elastomer available from Advanced Elastomer Systems, LP, an ExxonMobil Chemical Affiliate in Akron, Ohio, USA.

The soft pad portion 52 is "overmolded" onto the base structure 50. According to this method, after the base structure 50 is molded, it is placed into a second mold, or the first mold can be made adjustable to increase in size and change in shape, and the soft pad portion 52 is then molded onto base structure 50. Example of overmolding methods for other articles are described in U.S. Pat. Nos. 6,601,272 B2; 5,182,032I and 5,934,762 all herein incorporated by reference.

The soft pad part includes an elongated pad 62 having vertical grooves 62a. The elongated pad 62 extends inwardly toward the wearer's head, outwardly from the most inward facing surface 50a of the base structure 50. The base structure 50 provides a recess for partially receiving the pad 62. The soft pad portion 52 also includes anchors 66, 68 that are formed integrally with the pad 62, extend through holes 72, 74 through the base structure 50, and form cap-like heads or rivet head shapes 76, 78 on an outward facing surface of the base structure 50. The head shapes 76, 78 help lock the soft pad portion 52 to the base structure 50.

Figure 4:
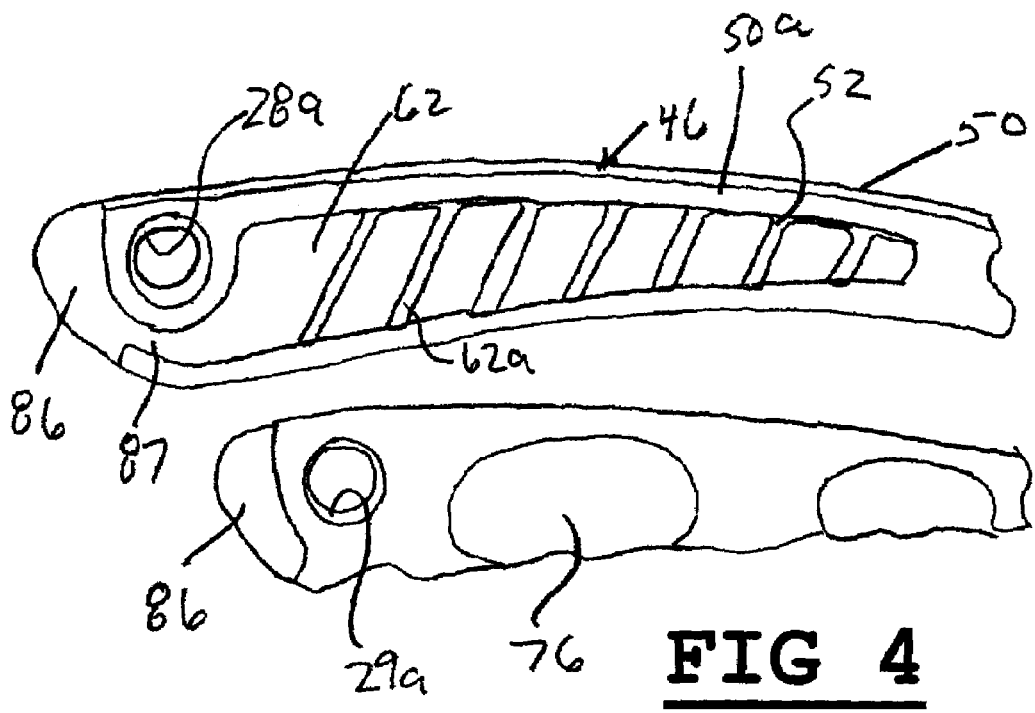
FIG. 4 is an enlarged, fragmentary perspective view of the ear stems taken along line 4-4 of FIG. 2.
Figure 5:
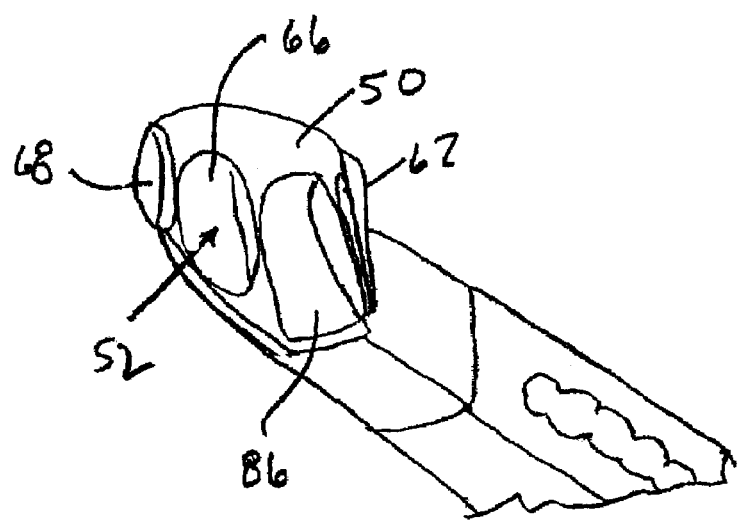
FIG. 5 is an end view of one ear stem taken along 5-5 of FIG. 2.
Figure 6:
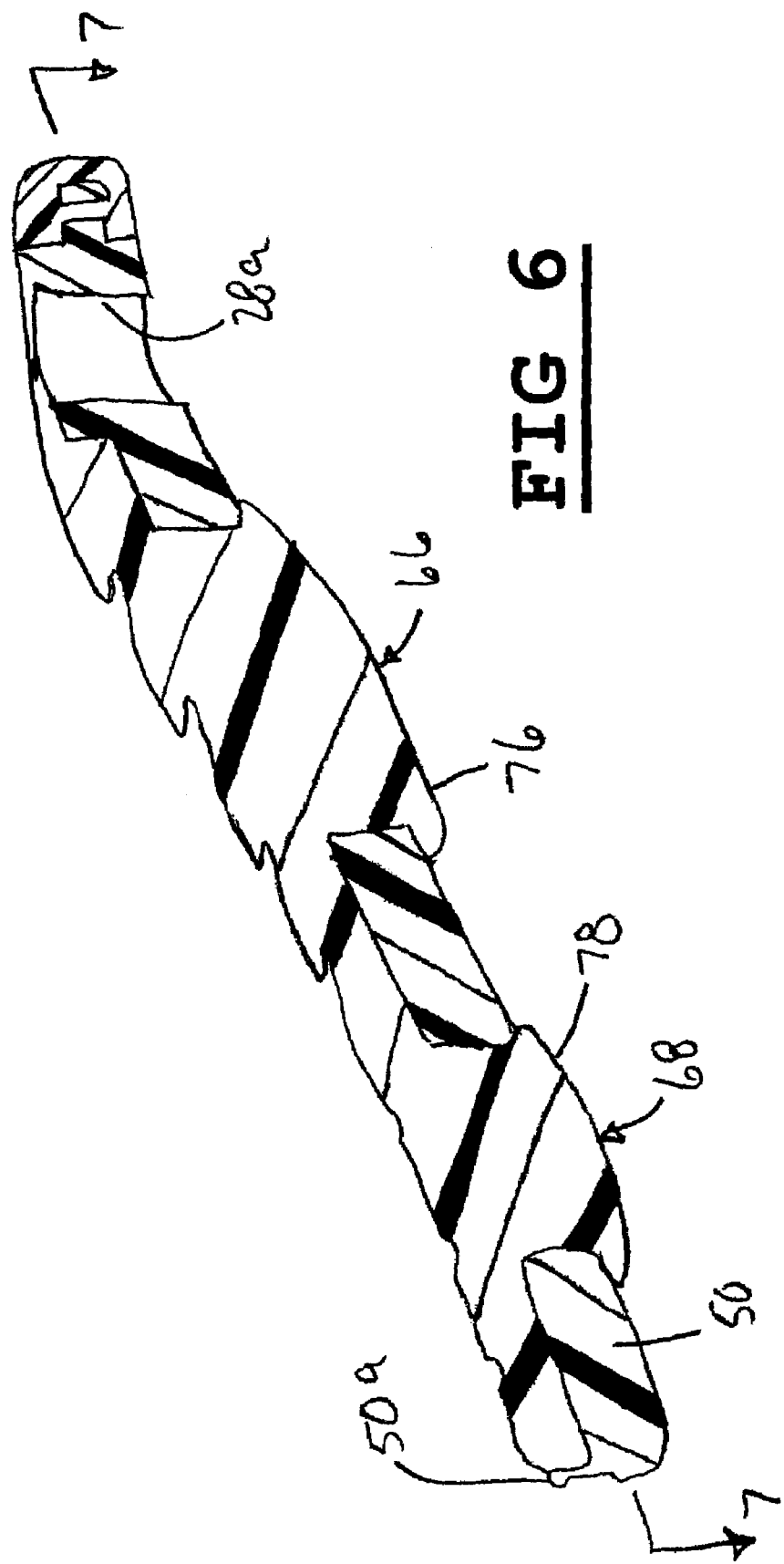
FIG. 6 is an enlarged, fragmentary sectional view taken generally along line 6-6 of FIG. 2.
Figure 7:
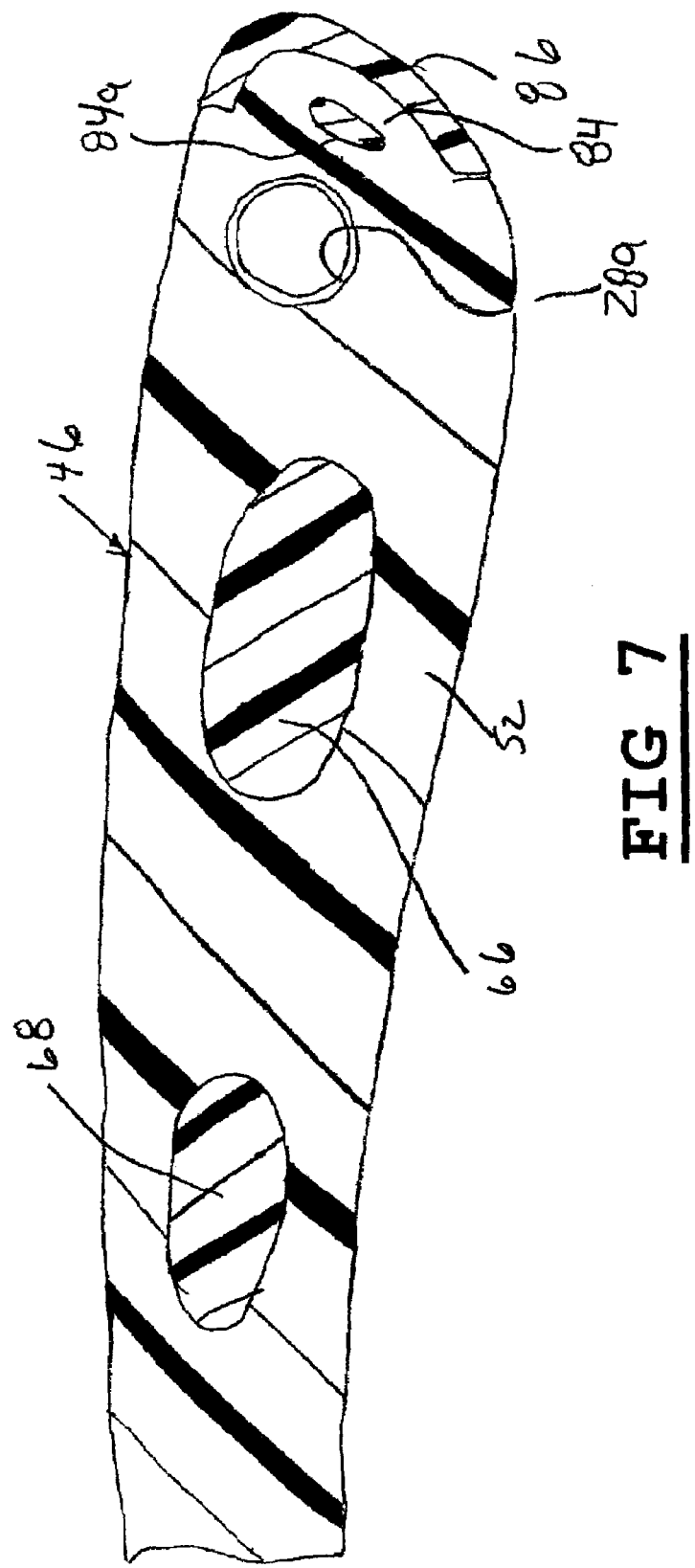
FIG. 7 is a fragmentary sectional view taken generally along line 7-7 of FIG. 6.

At a tip end of the base structure 50 an anchor loop 84 is formed. This anchor loop 84 is covered by a tip end protector portion 86 of the soft pad portion 52. The anchor loop 84 includes an aperture 84a that helps to prevent separation of the protector portion 86 from the stem 46. The protector portion 86 is made continuous during molding with the pad 62 by a curved neck portion 87 (FIG. 4).

The soft protector portions 86 are effective, not only to prevent irritation when putting the eyewear on the wearer's head, but prevents scratching of the inside of the lens 22 by the stem tip ends when the stems are folded to the lens in a conventional manner to store the eyewear in a pocket or case.

The present invention provides a secure and rugged manner of attaching a soft portion of eyewear stems that resists removal under harsh conditions. The soft portion is not only overmolded onto the harder stem base structure, but is also anchored by the geometry of the two overmolded components to form both a chemical and a mechanical fixation.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A stem for eyewear, comprising:
   an elongated base configured for support on a user's ear and comprising a relatively hard material;
   a soft pad portion molded onto said elongated base, said soft pad portion composed of a relatively soft material;
   wherein said base comprises at least one through hole and said soft pad portion comprises an anchor portion that is continuous through said through hole.

2. The stem according to claim 1, wherein said anchor portion comprises enlargements on opposite ends of said through hole, said enlargements being of a size greater than an adjacent through hole opening to fix said soft pad portion to said base.

3. The stem according to claim 2, wherein said at least one through hole of said stem base comprises a loop formed on an end of said stem base and said soft pad portion surrounds an outside of said loop.

4. The stem according to claim 1, wherein said at least one through hole of said base comprises a loop formed on an end of said base and said soft pad portion surrounds an outside of said loop.

5. The stem according to claim 4, wherein said anchor portion comprises enlargements on opposite ends of said through hole, said enlargements being of a size greater than an adjacent through hole opening to fix said soft pad portion to said base.

6. The stem according to claim 1, wherein said soft pad portion comprises a continuous pad on one side, and a plurality of anchor heads on an opposite side.

7. The stem according to claim 1, wherein said stem base is composed of a hard plastic and said soft pad portion is composed of a thermoplastic elastomer.

8. A method of forming a stem for eyewear, comprising the steps of:
   forming a stem base composed of a relatively hard material, said stem base having at least one through hole;
   placing said stem base in a mold cavity having a greater volume than said stem base;
   selecting a molding material that when hardened is softer than said stem base;
   injecting said molding material into said mold cavity to overmold said molded material onto opposite sides of said stem base and through said through hole.

9. The method according to claim 8, comprising the further steps of:
   forming said stem base having a loop at a distal end thereof, and arranging said mold cavity to have a space around said loop such that said molded material is overmolded onto said stem base covering said loop.

* * * * *